(12) United States Patent
Miles et al.

(10) Patent No.: US 10,254,926 B2
(45) Date of Patent: Apr. 9, 2019

(54) SYSTEMS, METHODS, AND SOFTWARE FOR PRESENTING PARAMETER SET(S) FOR INDUSTRIAL AUTOMATION DEVICES

(71) Applicant: ROCKWELL AUTOMATION ASIA PACIFIC BUSINESS CTR. PTE., LTD., Singapore (SG)

(72) Inventors: Scott Peter Miles, Belgium, WI (US); See Yong Koh, Singapore (SG); Alfred David Bassett, Jr., West Bend, WI (US); Daniel Joseph Middlestetter, Lyndhurst, OH (US); Teck Siang Tan, Singapore (SG); Julie Yeoh Pei Fang, Singapore (SG)

(73) Assignee: Rockwell Automation Asia Pacific, Singapore (SG)

( * ) Notice: Subject to any disclaimer, the term of this patent is extended or adjusted under 35 U.S.C. 154(b) by 692 days.

(21) Appl. No.: 13/760,337

(22) Filed: Feb. 6, 2013

(65) Prior Publication Data
US 2014/0081429 A1   Mar. 20, 2014

(30) Foreign Application Priority Data
Sep. 20, 2012   (SG) .............................. 201207001-7

(51) Int. Cl.
*G06F 3/0484* (2013.01)
*G05B 19/042* (2006.01)

(52) U.S. Cl.
CPC ......... *G06F 3/0484* (2013.01); *G05B 19/042* (2013.01); *G06F 3/04847* (2013.01); *G05B 2219/25067* (2013.01)

(58) Field of Classification Search
CPC . G06F 3/0484; G06F 3/04847; G05B 19/042; G05B 2219/25067
(Continued)

(56) References Cited

U.S. PATENT DOCUMENTS 6,178,393 B1 *   1/2001   Irvin ............................... 703/10
6,630,028 B2 *  10/2003   Briese et al. .................. 118/683
(Continued)

FOREIGN PATENT DOCUMENTS

| EP | 1710639 A2 | 10/2006 |
| GB | 2452614 A | 3/2009 |
| WO | 2011128293 A2 | 10/2011 |

OTHER PUBLICATIONS

"Variable Frequency Drive—CFW 11", Pamensky, http://www.pamensky.com/userfiles/literature/1328128891.pdf, all pages.*
(Continued)

*Primary Examiner* — Charles Kasenge

(57) ABSTRACT

Systems, methods, and software for presenting predefined parameter subsets for industrial automation devices and equipment are provided herein. In one example, a non-transitory computer readable medium having stored thereon program instructions executable by a computing device is presented. When executed by the computing device, the program instructions direct the computing device to present a graphical user interface with at least one predetermined subset of parameters, receive a user selection for one of the at least one predetermined subset of operating parameters for an industrial automation device, identify parameters associated with the selected subset, and display the identified subset of parameters.

15 Claims, 7 Drawing Sheets

(58) Field of Classification Search
USPC .................................. 700/79, 83; 715/781
See application file for complete search history.

(56) References Cited

U.S. PATENT DOCUMENTS

| | | | | |
|---|---|---|---|---|
| 6,905,452 | B1* | 6/2005 | Kirsch | 494/8 |
| 6,971,982 | B1* | 12/2005 | Kirsch | 494/8 |
| 7,233,885 | B1* | 6/2007 | Larabee | G06F 17/50 700/98 |
| 7,308,323 | B2* | 12/2007 | Kruk et al. | 700/32 |
| 7,387,602 | B1* | 6/2008 | Kirsch | 494/8 |
| 7,800,339 | B2* | 9/2010 | Gonzalez | B60H 1/00428 318/268 |
| 8,209,057 | B2* | 6/2012 | Judge | F25B 49/025 318/808 |
| 8,299,646 | B2* | 10/2012 | Rockenfeller | H02P 5/74 165/58 |
| 8,774,972 | B2* | 7/2014 | Rusnak et al. | 700/282 |
| 2004/0084179 | A1* | 5/2004 | Watson et al. | 166/250.15 |
| 2004/0221238 | A1 | 11/2004 | Cifra et al. | |
| 2004/0255852 | A1* | 12/2004 | Briese et al. | 118/696 |
| 2006/0058900 | A1* | 3/2006 | Johanson et al. | 700/83 |
| 2006/0058922 | A1* | 3/2006 | Kruk et al. | 700/275 |
| 2008/0288115 | A1* | 11/2008 | Rusnak et al. | 700/282 |
| 2009/0200245 | A1* | 8/2009 | Steinbrueck et al. | 210/741 |
| 2010/0125371 | A1* | 5/2010 | Judge | F25B 49/025 700/282 |
| 2011/0018472 | A1* | 1/2011 | Rockenfeller | H02P 5/74 318/51 |
| 2011/0078617 | A1 | 3/2011 | Kumagai et al. | |
| 2011/0214091 | A1 | 9/2011 | Nicol et al. | |
| 2011/0307100 | A1* | 12/2011 | Schmidtke et al. | 700/276 |
| 2013/0041479 | A1* | 2/2013 | Zhang et al. | 700/17 |
| 2013/0235494 | A1* | 9/2013 | Holce | H02H 3/08 361/31 |

OTHER PUBLICATIONS

"CFW 11 variable frequency drive—Google Search", printed Jun. 27, 2016, https://www.google.com/search?q=gsoft&hl=en&biw=1200&bih=1751&source=lnt&tbs=cdr%3A1&2Ccd_min%3A%2Ccd_max%3A9%2F20%2F2012&tbm=vid#hl=en&tbs=cdr:1%2Ccd_max:9%2F20%2F2012&tbm=vid&q=CFW+11+variable+frequency+drive.*

"VLT Series 3500", Danfoss, http://www.danfoss.com/NR/rdonlyres/AF594E1D-2E6E-4B2A-ABF4-0204C2DA83F1/0/3500IM.pdf, all pages.*

"Drives for HVAC", Danfoss, Dec. 2007, all pages.*

"Danfoss variable frequency drive—Google Search", printed Jun. 27, 2016, https://www.google.com/search?q=gsoft&hl=en&biw=1200&bih=1751&source=lnt&tbs=cdr%3A1%2Ccd_min%3A%2Ccd_max%3A9%2F20%2F2012&tbm=vid#hl=en&tbs=cdr:1%2Ccd_max:9%2F20%2F2012&tbm=vid&q=danfoss+variable+frequency+drive.*

"Honeywell Variable Frequency Drives", Honeywell, Aug. 1999, http://controltrends.org/wp-content/uploads/2012/04/Honeywell-VFD.pdf.*

"Frequency Inverter CFW-11 User's Manual", Weg, Feb. 2008, http://www.vfds.com/manuals/weg-cfw11-manual.pdf.*

"NXS, P Series Variable Frequency Drive", Nov. 2006, Honeywell, https://customer.honeywell.com/resources/Techlit/TechLitDocuments/63-0000s/63-1319.pdf.*

"Don Johns Engineering Control System—The Competion Solution: Tank Level Control Application", Don Johns Engineering, http://www.donjohns.com/site/files/722/75319/287318/760876/don-johns-tank-level-control-application.pdf.*

European Search Report, Application No. 13185104.0, Reference No. EP89680RK900ams, dated Mar. 31, 2016, 10 pages.

User's Manual Drive Wizard AC Drive Support Software Release 6.1, Yaskawa, Apr. 28, 2006, 154 pages.

E7 Drive User Manual, Yaskawa, Jan. 8, 2008, 244 pages.

* cited by examiner

| Centrifugal Pump | # | Fan | # | Compression | # | Conveyor | # | Mixer | # | Travel Crane | # |
|---|---|---|---|---|---|---|---|---|---|---|---|
| Motor NP Voltage | 31 | Motor NP Voltage | 31 | Motor NP Voltage | 31 | Motor NP Voltage | 31 | Motor NP Voltage | 31 | Motor NP Voltage | 31 |
| Motor NP Hertz | 32 | Motor NP Hertz | 32 | Motor NP Hertz | 32 | Motor NP Hertz | 32 | Motor NP Hertz | 32 | Motor NP Hertz | 32 |
| Motor OL Current | 33 | Motor OL Current | 33 | Motor OL Current | 33 | Motor OL Current | 33 | Motor OL Current | 33 | Motor OL Current | 33 |
| Minimum Frequency | 34 | Minimum Frequency | 34 | Minimum Frequency | 34 | Minimum Frequency | 34 | Minimum Frequency | 34 | Minimum Frequency | 34 |
| Maximum Frequency | 35 | Maximum Frequency | 35 | Maximum Frequency | 35 | Maximum Frequency | 35 | Maximum Frequency | 35 | Maximum Frequency | 35 |
| Start Source | 36 | Start Source | 36 | Start Source | 36 | Start Source | 36 | Start Source | 36 | Start Source | 36 |
| Stop Mode | 37 | Stop Mode | 37 | Stop Mode | 37 | Stop Mode | 37 | Stop Mode | 37 | Stop Mode | 37 |
| Speed Reference | 38 | Speed Reference | 38 | Speed Reference | 38 | Speed Reference | 38 | Speed Reference | 38 | Speed Reference | 38 |
| Accel Time 1 | 39 | Accel Time | 39 | Accel Time | 39 | Accel Time 1 | 39 | Accel Time | 39 | Accel Time | 39 |
| Decel Time 1 | 40 | Decel Time | 40 | Decel Time | 40 | Decel Time 1 | 40 | Decel Time | 40 | Decel Time | 40 |
| Digital In2 Sel | 51 | Comm Format | 51 | Start Boost | 102 | S Curve % | 65 | Digital In1 Sel | 51 | Digital In1 Sel | 51 |
| Digital In3 Sel | 52 | Comm Data Rate | 52 | Break Voltage | 103 | Comm Data Rate | 83 | Digital In2 Sel | 52 | Digital In3 Sel | 53 |
| Relay Out1 Sel | 55 | Comm Mode Address | 53 | Break Frequency | 104 | Comm Mode Address | 86 | Relay Out Sel | 55 | Digital In4 Sel | 54 |
| Relay Out2 Sel | 56 | Comm Loss Action | 55 | Reverse Disable | 105 | Comm Loss Action | 87 | Analog Out Sel | 65 | Relay Out Sel | 55 |
| Analog Out1 Sel | 65 | Comm Loss Time | 56 | Comm Data Rate | 106 | Comm Loss Time | 98 | Preset Freq 0 | 70 | Preset Freq 0 | 70 |
| Reverse Disable | 84 | Reverse Disable | 21 | Comm Mode Address | 95 | Comm Format | 103 | Preset Freq 1 | 71 | Preset Freq 1 | 71 |
| Flying Start En | 98 | Motor NP Poles | 95 | Comm Loss Action | 97 | Slip Hertz@FLA | 104 | Torque Perf Mode | 125 | Jog Frequency | 72 |
| Motor NP Poles | 117 | Motor NP FLA | 117 | Comm Loss Time | 98 | | | Motor NP FLA | 117 | Jog Accel/Decel | 79 |
| Motor NP FLA | 125 | | | Comm Format | 107 | | | Autotune | 127 | Reverse Disable | 85 |
| | | | | Torque Perf Mode | 125 | | | | | Torque Perf Mode | 125 |
| | | | | Motor NP FLA | 126 | | | | | Motor NP FLA | 126 |
| | | | | | | | | | | Autotune | 127 |

FIGURE 7

SYSTEMS, METHODS, AND SOFTWARE FOR PRESENTING PARAMETER SET(S) FOR INDUSTRIAL AUTOMATION DEVICES

CROSS REFERENCE TO RELATED APPLICATIONS

This application claims priority to Singapore Patent Application Number 201207001-7 filed Sep. 30, 2012 which is incorporated by reference for all purposes.

TECHNICAL FIELD

Aspects of the disclosure are related to the field of industrial automation, and in particular, to software, systems, and methods for presenting parameter set(s) for industrial automation devices and equipment.

TECHNICAL BACKGROUND

Industrial automation environments can include various machine systems, industrial automation devices, and industrial processes, such as those found in factories, milling operations, manufacturing facilities, and the like. These machine systems and industrial automation devices typically include an operation or process implemented by a mechanical or electrical device. Specific examples of these devices and systems can include various functions of machinery associated with industrial automation including manufacturing equipment, assembly equipment, milling equipment, process equipment, and packaging equipment, or other machine systems.

As a specific example, many industrial automation devices include variable frequency drives (VFDs). These VFDs can be included in industrial automation devices to provide variable frequency alternating current (AC) power in order to drive and control motor equipment such as conveyors, fans, pumps, augers, mills, or other equipment.

Prior to installation and active service of many of these industrial automation devices, such as VFDs, may have many operational parameters, which may need to be programmed or set before start up of the system. For various different implementations there may be only a subset of the parameters which need to be changed from the factory default settings to relatively quickly get the industrial device started and running. It may take a user a relatively long amount of time to identify which parameters need to be addressed for the particular use of the VFD, and what values are needed for the specific application.

Overview

Systems, methods, and software for presenting parameter sets for industrial automation devices and equipment are provided herein. In one example, a non-transitory computer readable medium having stored thereon program instructions executable by a computing device is presented. When executed by the computing device, the program instructions direct the computing device present, to a user, a plurality of options corresponding to at least one set of programmable operating parameters for an industrial control device, receive a selection of at least one the plurality of options, identify the set of programmable operating parameters corresponding to the selected option, and initiate display of the identified set of programmable operating parameters to a user.

In a second example, a method of generating load profile information for industrial automation equipment is presented. The method includes presenting a user interface with at least one subset of programmable operating parameters for an industrial control device, receiving a user selection for one of the at least one subset of programmable operating parameters for the industrial control device, identifying the programmable operating parameters associated with the user selection, and displaying the identified programmable operating parameters to a user.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

FIG. 7 is a diagram illustrating applications and application specific subsets of parameters of a parameter subset presenting system, according to an example.

DETAILED DESCRIPTION

Figure 1:
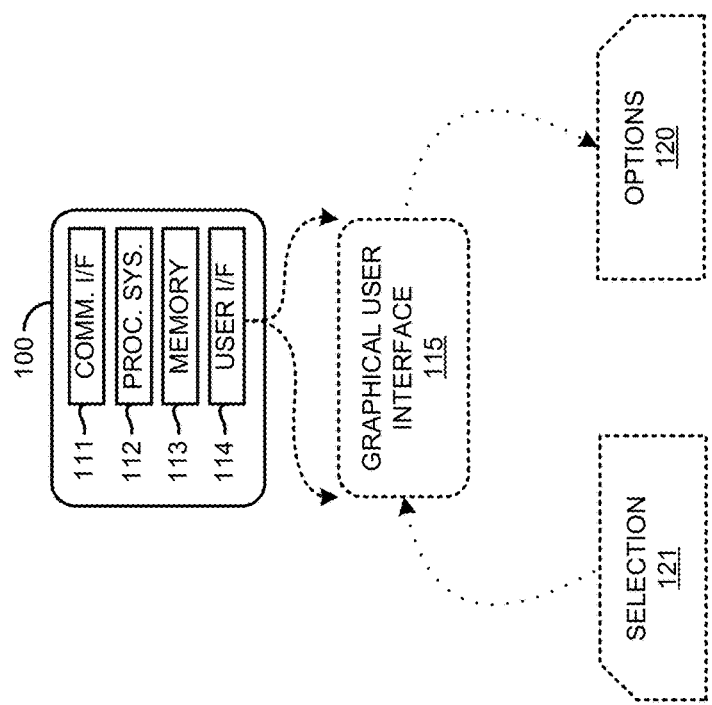
FIG. 1 is a system diagram illustrating a parameter subset presenting system.

FIG. 1 is a system diagram illustrating parameter subset presenting system 100. Parameter subset presenting system 100 includes communication interface 111, processing system 112, memory 113, and user interface 114. In this example, user interface 114 presents graphical user interface 115. Graphical user interface 115 can present parameter subsets 120 and receive user input for application selection 121. In operation, processing system 112 is operatively linked to communication interface 111, memory 113, and user interface 114. Processing system 112 is capable of executing software stored in memory 113. When executing the software, processing system 112 drives parameter subset presenting system 100 to operate as described herein.

Figure 2:
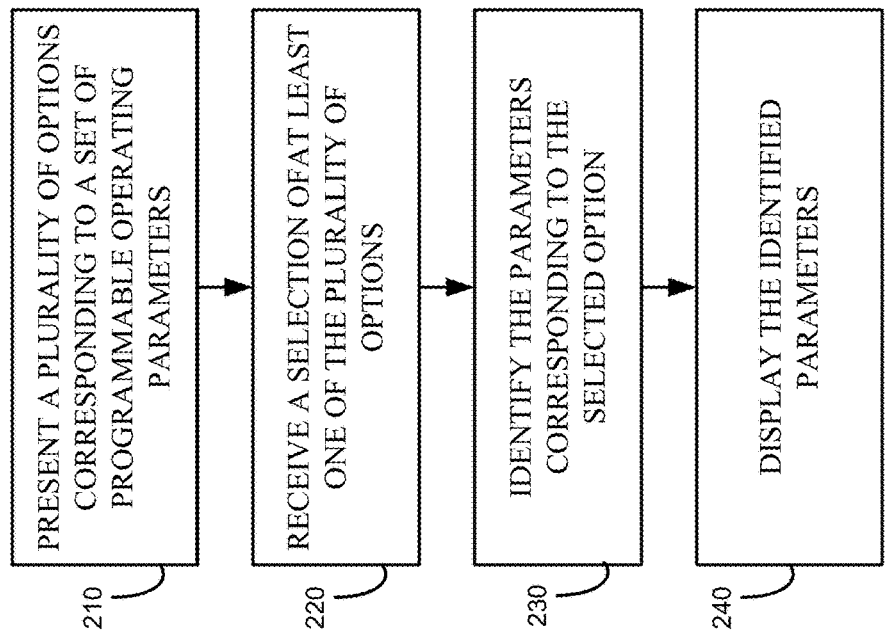
FIG. 2 is a flow diagram illustrating a method of operation of a parameter subset presenting system.

FIG. 2 is a flow diagram illustrating a method of operation of parameter subset presenting system 100. The operations of FIG. 2 are referenced herein parenthetically. In FIG. 2, parameter subset presenting system 100 presents (210) a plurality of options corresponding to at least one set of programmable operating parameters for an industrial control device. The plurality of options is indicated by parameter subset 120 in FIG. 1.

Parameter subset presenting system 100 receives (220) receive a selection 121 for one of the plurality of options. The options can correspond to a parameter set presented by graphical user interface 115. In some examples, parameter sets can include default or predetermined values of a subset of all parameters that are application specific subsets and may include suggested values for the parameters. Parameter subset may be application, device, industrial, arbitrary, or any other grouping of parameters.

Once the selection has been received, parameter subset presenting system 100 can identify the programmable operating parameters corresponding to the selected option (230). The parameter subsets may be application specific, such as a fan, pump, conveyor, etc. The parameter subsets may be industry specific, such as farming, mining, irrigation, etc. The parameter subsets may be customizable by the user or another entity. The parameter subsets may be arbitrary and labeled red, green, blue, etc. The parameter subsets may be any other grouping of a subset of parameters. The identification of associated parameters may be predetermined, and/or may be modifiable.

Once the parameters corresponding to the selected option are identified, the identified parameters may be displayed (240). The display of parameters may be on graphical user interface 115. In the example where industrial device is a VFD, the parameters may be displayed on a 1-3 line display, and may be scrolled through, either automatically or via user inputs. The user interface on a VFD has the functionality to change the values of the parameters being viewed.

In the example where a computer is connected to the industrial device, many or all of the subset may be displayed on a computer screen. The user interface 115 may also be capable of displaying factory default setting, and have further functionality to modify the values for the parameters.

In the example where the industrial device includes a VFD, there may be upwards of 700 different programmable parameters. A user may want to start up the system relatively quickly. In this example the user could select an indicator for the application, such as a pump. A "pump" subset of parameters may then be displayed for the user, such that the user may modify the parameters in the subset to start up the system more quickly than if the user had to view, understand, select, and modify the appropriate parameters. The parameter subset may be application, industrial, and/or device specific, as well as custom subsets defined by a user, or any other subset grouping.

An industry or application specific subset may be retrieved and then can be modified to create a custom set of parameters. For instance, a user may want to program and control many of a specific type of pump. The user may get the pump subset of parameters, then modify the subset and rename it "Air Pump." Furthermore, a user may request a blank template to populate with the parameters of interest for the use of the industrial control device.

Referring back to FIG. 1, communication interface 111 may include communication connections and equipment that allows for communication with external systems and devices. Examples of communication interface 111 include network interface cards, wired interfaces, wireless interfaces, transceivers, antennas, power amplifiers, RF circuitry, optical networking equipment, and other communication circuitry.

Processing system 112 may be implemented within a single processing device but may also be distributed across multiple processing devices or sub-systems that cooperate in executing program instructions. Examples of processing system 112 include general purpose central processing units, microprocessors, application specific processors, industrial control devices, and/or logic devices, as well as any other type of processing device.

Memory 113 may comprise any storage media readable by processing system 112 and capable of storing software. Memory 113 may include volatile and nonvolatile, removable and non-removable media implemented in any method or technology for storage of information, such as computer readable instructions, data structures, program modules, or other data. Memory 113 may be implemented as a single storage device but may also be implemented across multiple storage devices or sub-systems. Memory 113 may comprise additional elements, such as a controller, capable of communicating with processing system 112. Examples of storage media include random access memory, read only memory, and flash memory, as well as any combination or variation thereof, or any other type of storage media. In some implementations, the storage media may be a non-transitory storage media. In some implementations, at least a portion of the storage media may be transitory. It should be understood that in no case is the storage media a propagated signal.

Software stored on or in memory 113 may comprise computer program instructions, firmware, or some other form of machine-readable processing instructions having processes that when executed by processing system 112 direct parameter subset presenting system 100 to operate as described herein.

The software may also include user software applications. The software may be implemented as a single application or as multiple applications. In general, the software may, when loaded into processing system 112 and executed, transform processing system 112 from a general-purpose device into a special-purpose device customized as described herein.

User interface 114 may have input devices such as a keyboard, a mouse, a voice input device, arrow up/down buttons, and/or a touch input device, and comparable input devices. Output devices such as a display, speakers, printer, and other types of output devices may also be included with user interface 114. For example, in FIG. 1, user interface 114 includes graphical user interface 115 for displaying parameters and receiving input data. User interface 114 may also be considered to be an integration of parameter subset presenting system 100 with software elements, such as operating system and application software.

Graphical user interface 115 can include graphical and text-based user input elements, such as forms, slider bars, text boxes, buttons, radio buttons, check boxes, windows, icons, and pull-down menus, among other input elements, including combinations or variations thereof. Graphical user interface 115 can be presented in a spreadsheet, interactive web page, discrete application, mobile phone app, tablet device app, windowing environment, or other graphical environments. Operating parameters included in parameter subsets 120 can include any environmental or operational parameter for an industrial control device or associated controller devices.

Although item 120 is described as options, item 120 can include parameter subsets, or icons which may be indicative or associated with the various parameters sets and/or subsets.

Example industrial automation devices can include an operation or process implemented by a mechanical or electrical device. Examples of industrial automation devices include various functions of machinery associated with industrial automation including manufacturing equipment, assembly equipment, packaging equipment, milling equipment, or other machine systems, including combinations thereof. Variable frequency drives (VFD) can be included in the industrial automation devices as controller devices to electrically control a frequency of electrical power supplied to a motor, and thus control a speed, torque, acceleration, direction, or other operations of a motor within an industrial automation device.

Figure 3:
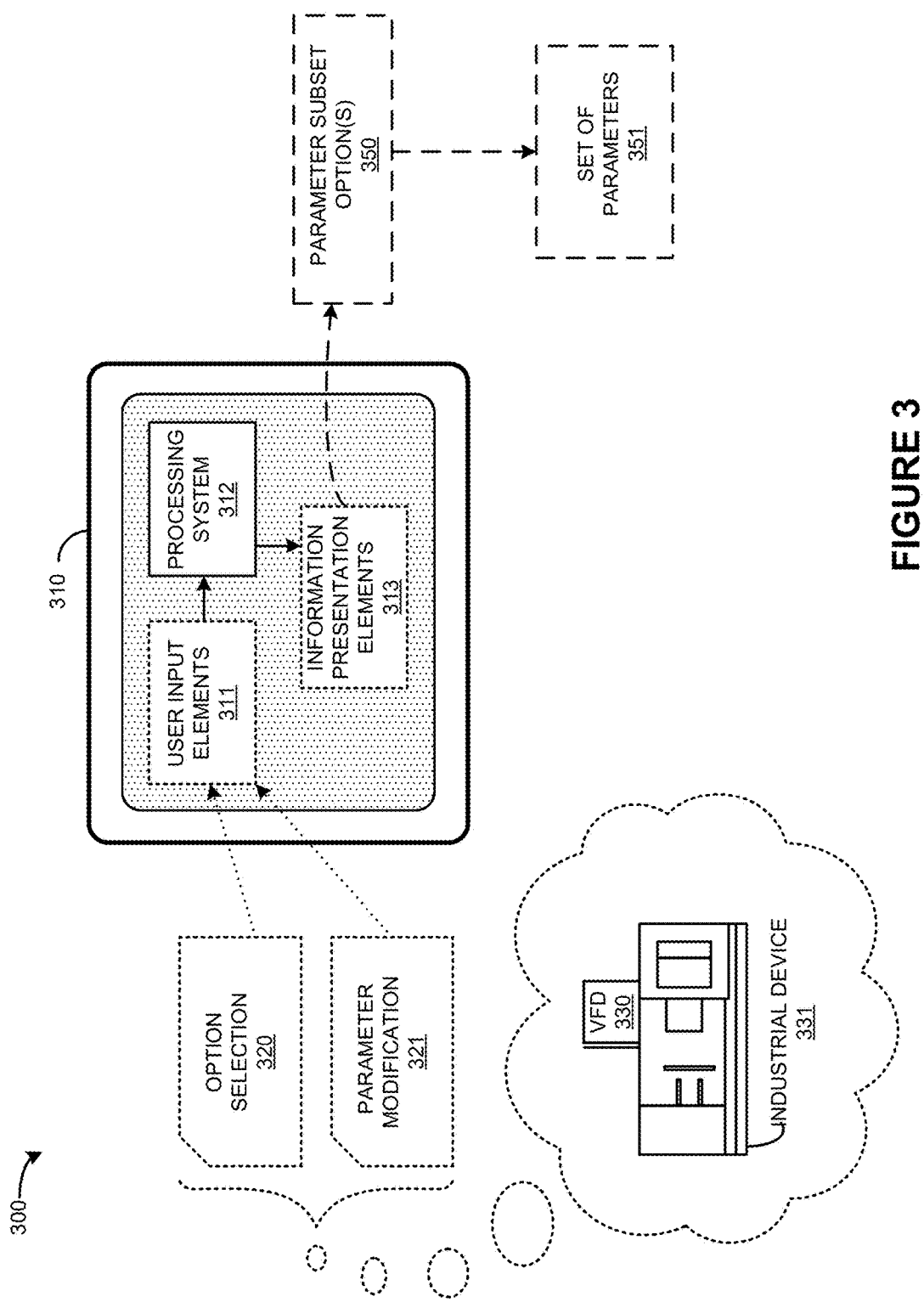
FIG. 3 is a system diagram illustrating a parameter subset presenting environment.

FIG. 3 is a system diagram illustrating parameter subset presenting environment 300. Parameter subset presenting environment 300 includes parameter subset presenting system 310 which further includes user input elements 311, processing portion 312, and information presentation elements 313.

Information presentation elements 313 can present parameter subset options(s) 350, along with other information, to a user of parameter subset presenting system 310. An option may be selected 320, and then a set of parameters may be displayed 351. Parameter value modification 321 may then be accomplished.

User input elements 311 can receive user input such as option selection 320 and parameter modification 321. Processing portion 312 can process information received through user input elements 311 and other information to determine which subset of parameters 351 to display.

In this example, subset presenting system 310 is a computing device, such as a personal computer, laptop, tablet computing device, mobile smartphone, server, industrial control device, or other computing device which can receive user input and present a user interface. Parameter subset presenting system 310 can be an example of parameter subset presenting system 100, although different configurations can be employed.

In operation, processing portion 312 will direct further portions of parameter subset presenting system 310 to generate and present user input elements 311, such performed by a display, audio device, screen, touchscreen, video processing portion, or other elements. In some examples, a web-based interface is presented over a network link for a web browser application of a user.

User input elements 311 can include user interface and/or graphical user interface elements, such as graphical and text-based user input elements, including forms, slider bars, text boxes, buttons, radio buttons, check boxes, windows, icons, and pull-down menus, among other input elements, including combinations or variations thereof. The user input can be received over a plurality of input devices, such as a buttons, touchscreen, keyboard, keypad, mouse, pointer device, speech recognition elements, or other input equipment. User input elements 311 receives subset selection 320 and parameter modification 321 from a user of reliability processing system 310. In this example, the parameters reflect an operating environment for industrial device 331 which is driven by VFD 330.

Different applications and industries employ industrial device 331 under different operating and environmental conditions, as indicated above. The industry typically indicates the general realm of use for the industrial automation equipment. Example industries include material handling, mining/cement, rubber/plastics, food/beverage, consumer goods, textiles, water/waste water, automotive, oil/gas, and pulp/paper, among other industries, including combinations thereof. The application typically indicates the specific type of function or process used by the industrial automation equipment. Example applications include belt conveyors, chain conveyors, diverters, palletizers, centrifugal fans/pumps, cooling/baking conveyors, positive displacement compressors, hoists, cranes, auger conveyors, ball mills, rotary kilns, induced draft fans, beater type mixers, crushers/pulverizers, extruders, blown film, injection molding, blow molding, screw compressors, center driven winders, sugar centrifuges, punch presses, textile machines, engine/transmission test stands, recirculation fans, compressors, chippers, mixers, flow/pumps, converting, and web handling, including combinations thereof.

Many industrial automation devices include variable frequency drives (VFDs). These VFDs provide variable frequency power to drive and control motor equipment. In this example, VFD 330 provides variable frequency alternating current (AC) power to industrial device 331. Industrial device 331 can include an operation or process implemented by a mechanical or electrical device.

Examples of industrial device 331 include various functions of machinery associated with industrial automation including manufacturing equipment, assembly equipment, packaging equipment, milling equipment, presses, hydraulic equipment, industrial vehicles, vats, batch process equipment, tanks, fillers, sorters, scanning equipment, or other machine systems, including combinations thereof. Further examples of industrial device 331 include machine control systems, such as motor power controls, motor control centers, pump power controls, lathe machine speed controls, roller mechanism engagement systems, on/off functions of a manufacturing device, a lift function for a forklift, robotic arms, among other examples. Yet further examples of industrial device 331 include Rockwell Automation or other industrial automation and information products including operator interfaces, drives, motors, I/O modules, programmable controllers, circuit breakers, contactors, motor protectors, energy and power monitors, PowerFlex® drives, servo drives, servo motors, push buttons, signaling devices, relays, timers, switches, or safety devices.

Figure 4:
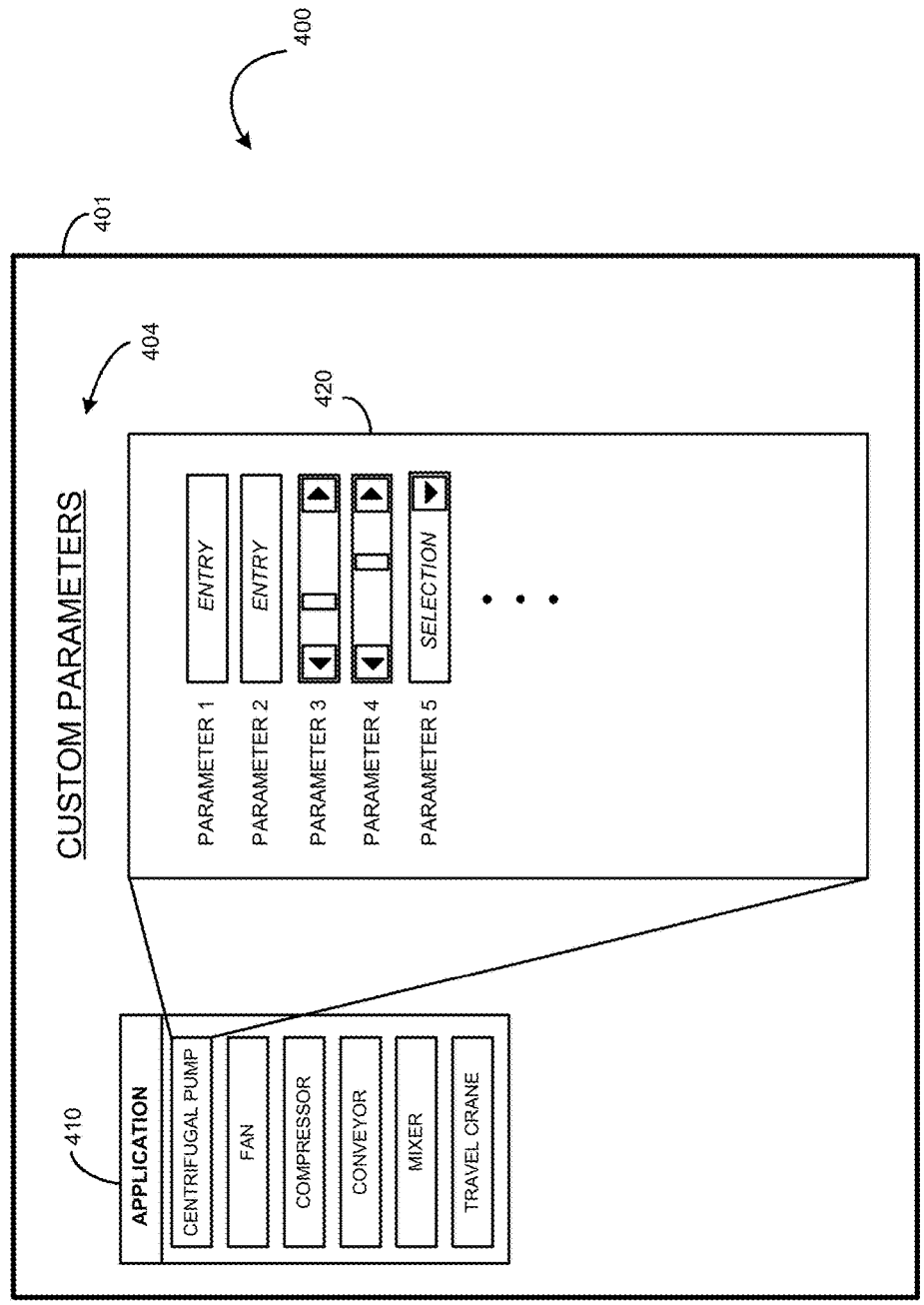
FIG. 4 is a block diagram illustrating an example graphical user interface.

FIG. 4 is a block diagram illustrating example graphical user interface (GUI) 400. Graphical user interface 400 can be employed in the examples parameter subset presenting systems presented herein, although other configurations can be employed. In this non-limiting example, GUI 400 is capable of presenting a subset of parameters for a variable frequency drive (VFD) portion of an industrial automation device, as indicated by title 404. GUI 400 may be presented on a computer screen, tablet, on the display of an industrial control device, or any other device capable of displaying the information.

GUI 400 includes main window 401 which includes various further GUI elements. These elements include parameter subset group portion 410, and parameter display and modification portion 420. Although GUI 400 illustrates a specific example of a graphical user interface presented to a user for receiving user input and presenting parameter subset information and selection, it should be understood that other representations can be employed. Graphical user interface 400 can be presented in a spreadsheet, interactive web page, discrete application, mobile phone app, tablet device app, windowing environment, or other graphical environments.

Elements 410, 420 are presented to a user via a graphical or video display on a computing device, or industrial device display, such as those found in the examples herein. Element 410 presents various options application-specific subset of parameters for the VFD (or associated industrial automation device) of interest. Application selections are presented in selection elements. Element 420 presents various options for parameters that the VFD of interest will likely need programmed for use. These include 5 parameters in this example, and can be any of the parameters discussed herein presented to the user in a variety of graphical user input element types, such as text fields, pull-down selections, slider bars, or other types. Parameters in element 420 can include any operational or environmental parameters such as discussed in FIGS. 1 and 3.

Once a user has input selected an application, in element 410, a subset of parameters for the VFD may be presented via element 420. Element 420 may also present factory defaults for the parameter values, and/or may present suggested values or range of values for the parameters based at least in part of the application selected. Element 420 is further capable of receiving modifications to the various parameter values and passing them on to parameter subset presenting system 300 or 100.

GUI 400 may also include the functionality and ability to present more information such as help information, manuals, and other information about the industrial device, and/or the application parameter subsets, and their specific uses, among other information.

Figure 5:
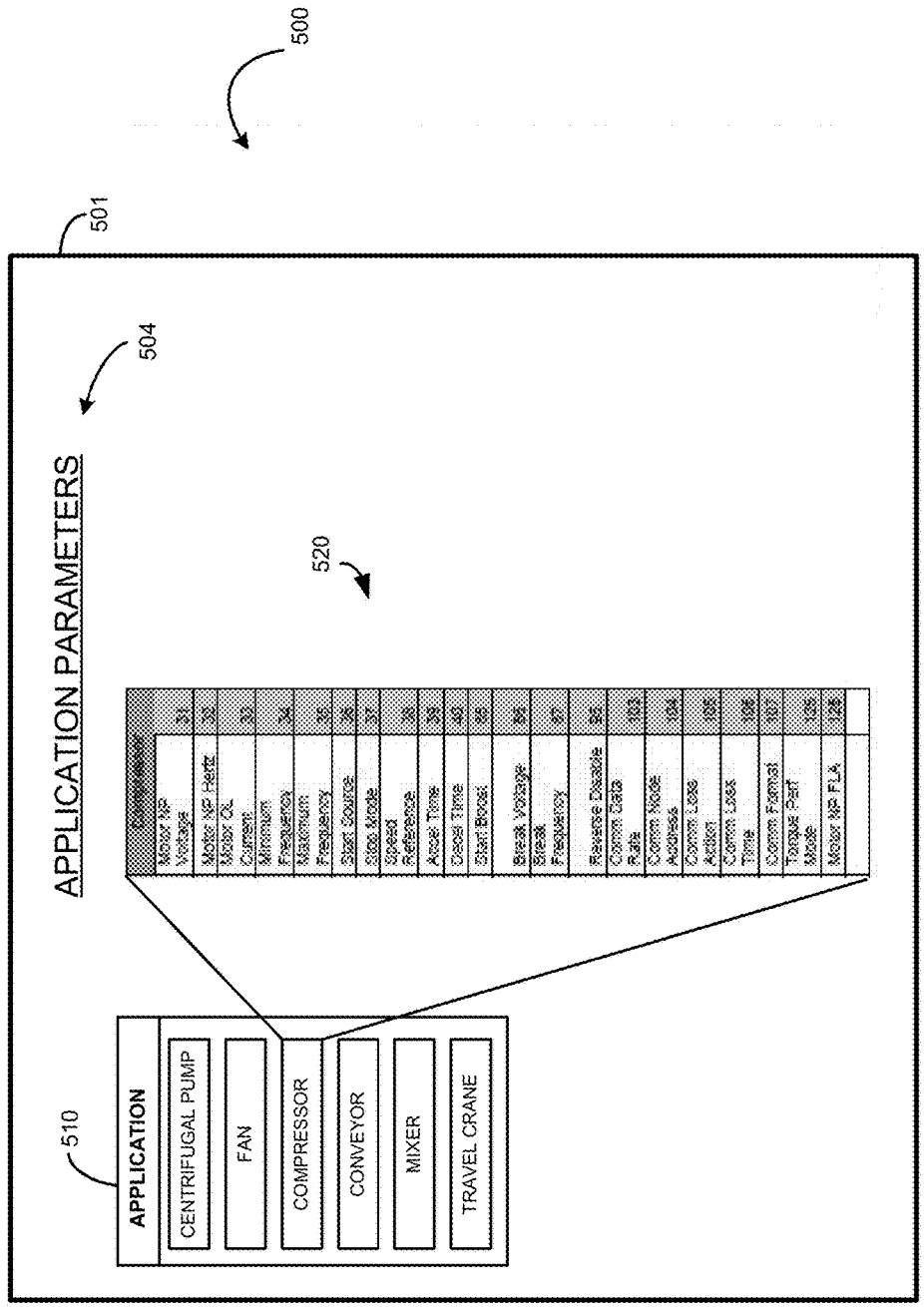
FIG. 5 is a block diagram illustrating an example graphical user interface.

FIG. 5 is a block diagram illustrating example graphical user interface (GUI) 500. Graphical user interface 500 can be employed in the examples parameter subset presenting systems presented herein, although other configurations can be employed. In this non-limiting example, GUI 500 is capable of presenting a subset of parameters for a variable frequency drive (VFD) portion of an industrial control device, as indicated by title "APPLICATION PARAMENTERS" 504. GUI 500 may be presented on a computer screen, tablet, on the display of an industrial control device, or any other device capable of displaying the information.

GUI 500 includes main window 501 which includes various further GUI elements. These elements include parameter subset group portion 510, and parameter display and modification portion 520. Although GUI 500 illustrates a specific example of a graphical user interface presented to a user for receiving user input and presenting parameter subset information and selection, it should be understood that other representations can be employed. Graphical user interface 500 can be presented in a spreadsheet, interactive web page, discrete application, mobile phone app, tablet device app, windowing environment, or other graphical environments.

In this example, the application specific parameter subset 520 is that of a compressor. The identified parameters for the selection of "compressor" application are shown. The VFD may be controlling the drive motor for a compressor. For instance, parameter 95 "reverse disable" may be important to a user as a compressor is typically not run backward. This may cause damage to the controlled industrial device.

Elements 510, 520 are presented to a user via a graphical or video display on a computing device, or industrial device display, such as those found in the examples herein. Element 510 presents various options application-specific subset of parameters for the VFD (or associated industrial automation device) of interest. Application selections are presented in selection elements 510. Element 520 presents various options for parameters that the VFD of interest will likely need programmed for use. These include 21 parameters in this example, and can be any of the parameters discussed herein presented to the user in a variety of graphical user input element types, such as text fields, pull-down selections, slider bars, or other types. Parameters in element 520 can include any operational or environmental parameters such as discussed in FIGS. 1 and 3.

Once a user has input selected an application, in element 510, a subset of parameters for the VFD may be presented via element 520. Element 520 may also present factory defaults for the parameter values, and/or may present suggested values or range of values for the parameters based at least in part of the application selected. Element 520 is further capable of receiving modifications to the various parameter values and passing them on to parameter subset presenting system 300 or 100.

GUI 500 may also include the functionality and ability to present more information such as help information, manuals, and other information about the industrial device, and/or the application parameter subsets, and their specific uses, among other information.

Figure 6:
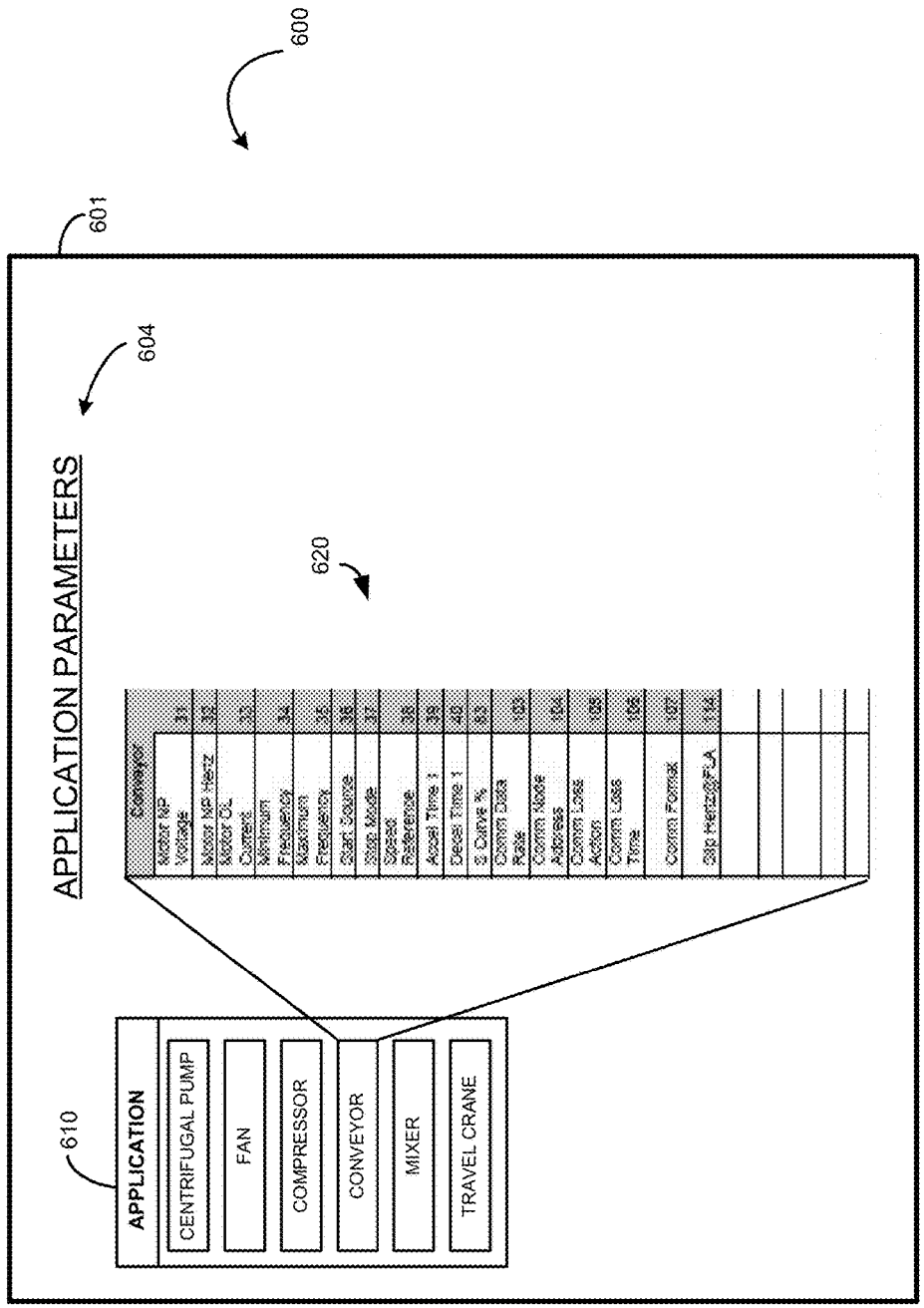
FIG. 6 is a block diagram illustrating an example graphical user interface.

FIG. 6 is a block diagram illustrating another example graphical user interface (GUI) 600. Graphical user interface 600 can be employed in the examples parameter subset presenting systems presented herein, although other configurations can be employed. In this non-limiting example, GUI 600 is capable of presenting a subset of parameters for a variable frequency drive (VFD) portion of an industrial automation device, as indicated by title 604. GUI 600 may be presented on a computer screen, tablet, on the display of an industrial control device, or any other device capable of displaying the information.

GUI 600 includes main window 601 which includes various further GUI elements. These elements include parameter subset group portion 610, and parameter display and modification portion 620. Although GUI 600 illustrates a specific example of a graphical user interface presented to a user for receiving user input and presenting parameter subset information and selection, it should be understood that other representations can be employed. Graphical user interface 600 can be presented in a spreadsheet, interactive web page, discrete application, mobile phone app, tablet device app, windowing environment, or other graphical environments.

In this example, the application specific parameter subset 620 is that of a Conveyor. The identified parameters for the selection of "conveyor" application are shown. The VFD may be controlling the drive motor for a compressor. For instance, parameter 33 "motor OL current" may be important to a user. This may represent the maximum current the motor for the conveyor may provide. This may be important to a user to limit the amount of current as this would not allow the conveyor system to be overloaded, or may indicate mechanical binding or other problems with the conveyor system. This may cause damage to the controlled industrial device.

Not included in this subset and example is parameter 95 "reverse disable". It may be desirable for a conveyor to run in two directions. Therefore, parameter 95 "reverse disable" may not be included in this subset.

Elements 610, 620 are presented to a user via a graphical or video display on a computing device, or industrial device display, such as those found in the examples herein. Element 610 presents various options application-specific subset of parameters for the VFD (or associated industrial automation device) of interest. Application selections are presented in selection elements. Element 620 presents various options for parameters that the VFD of interest will likely need programmed for use. These include 17 parameters in this example, and can be any of the parameters discussed herein presented to the user in a variety of graphical user input element types, such as text fields, pull-down selections, slider bars, or other types. Parameters in element 620 can include any operational or environmental parameters such as discussed in FIGS. 1 and 3.

Once a user has input selected an application, in element 610, a subset of parameters for the VFD may be presented via element 620. Element 620 may also present factory defaults for the parameter values, and/or may present suggested values or range of values for the parameters based at least in part of the application selected. Element 620 is further capable of receiving modifications to the various parameter values and passing them on to parameter subset presenting system 300 or 100.

GUI 600 may also include the functionality and ability to present more information such as help information, manuals, and other information about the industrial device, and/or the application parameter subsets, and their specific uses, among other information.

FIG. 7 is a diagram 700 illustrating applications and application specific subsets of parameters of a parameter subset presenting system, according to an example. Shown are applications 710. Applications 710 may include common industrial applications that a VFD may be used within. In this non-limiting example, the applications include, centrifugal pump, fan, compressor, conveyor, mixer, and travel crane. It will be appreciated that these application are only an example and many other applications may be configured. Furthermore, it will be appreciated that although application specific subset are shown, any other subset may be preconfigured or defined, including subset configured by a user.

Diagram 700 also includes the parameter name 720. These parameter names 720 may include abbreviations, and may be specific to Rockwell® industrial automation devices.

Also included in this example are parameter numbers 730. The parameters may be numbered and scrolled through sequentially on a VFD or other industrial control device. Not shown are the parameter values. The parameter values may include factory default settings, application specific values or ranges, and/or selected subset defined values, or other values.

Figure 8:
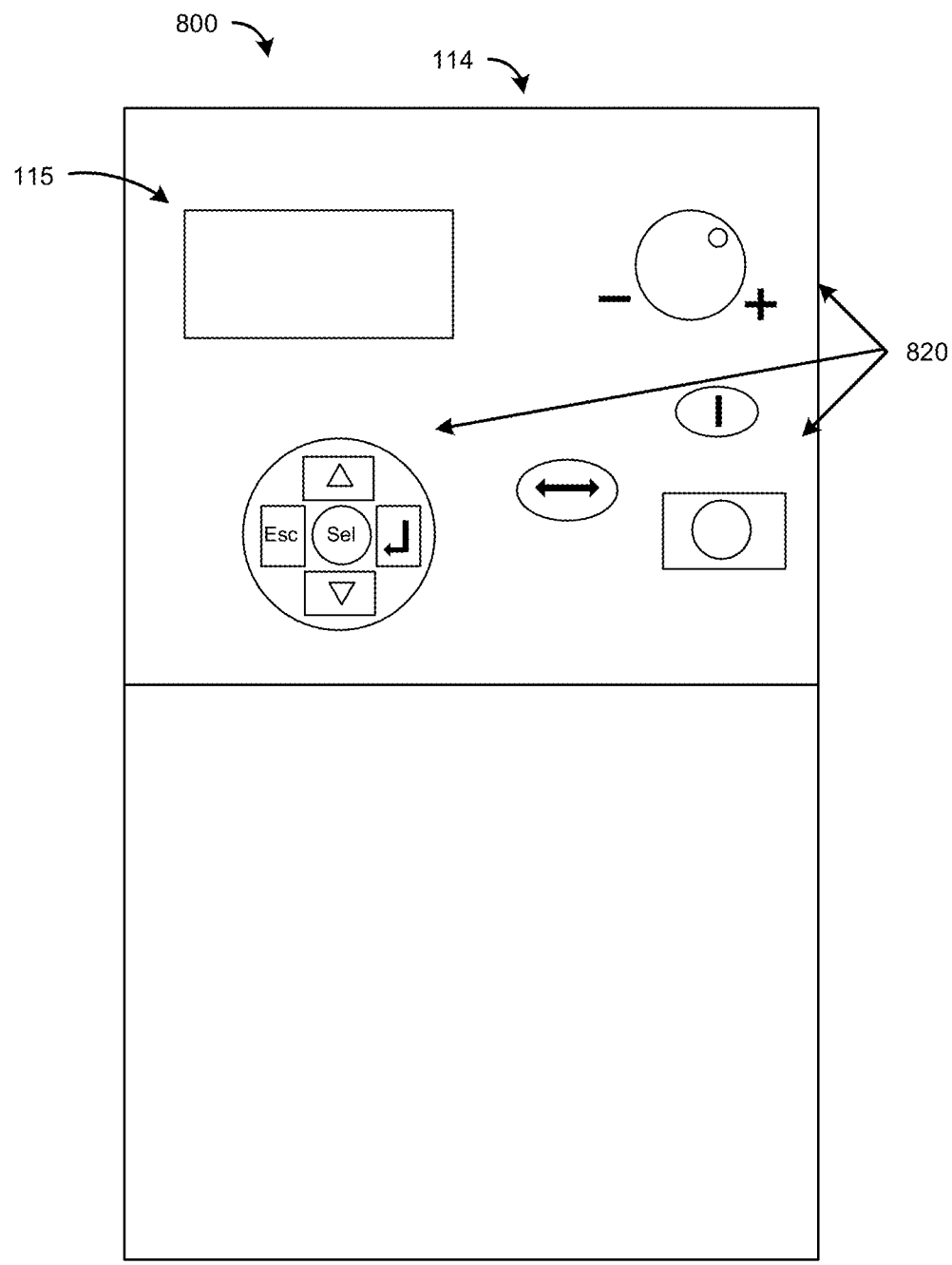
FIG. 8 is an industrial control device according to an example.

FIG. 8 is an industrial control device 800, according to a non-limiting example. Industrial control device 800 may include a user interface 114. User interface 114 may include a display 115 and actuator/buttons 820. Buttons 820 may have the capability to allow a user to select and change parameters within the industrial control device 800.

User interface 114 may have input devices 820 such as a keyboard, a mouse, a voice input device, arrow up/down buttons, and/or a touch input device, and comparable input devices. Output devices such as a display, speakers, printer, and other types of output devices may also be included with user interface 114.

Display 810 may be and liquid crystal display (LCD), or other type of display. Device 800 can scroll descriptive text for display, either automatically or via user inputs 820. The device may also support multiple languages. The device can also display descriptive text for the various parameters, such that the device may be easier for a user to program and operate.

The display may be programmed to scroll through the various options, and/or sets of parameters 120, such that a user may select the option and the set of parameters associated with the selection may be presented to the user. The user may then edit/change the parameters according to the application. Device 800 may also allow a user to set up custom sets of parameters to reduce the time and complexity of programming and starting the industrial control device 800.

Device 800 can also connect to a PLC, for operation. Device 800 can also connect to a computer with software user to program the device. Device 800 may also have the capability of connecting to an Ethernet network, which may reduce the number of cables needed for the industrial automation system.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of this disclosure. Those skilled in the art will also appreciate that the features described above can be combined in various ways to form multiple embodiments. As a result, the invention is not limited to the specific embodiments described above, but only by the claims and their equivalents.

What is claimed is:

1. A non-transitory computer readable medium having stored thereon program instructions executable by a computing device that, when executed by the computing device, direct the computing device to:
    present, to a user, a plurality of application options, each application option corresponding to a respective type of application for which a variable frequency drive (VFD) may be purposed;
    receive a selection of one of the plurality of application options;
    in response to receipt of the selected application option, identify a distinct set of programmable operating parameters corresponding to the selected application option from a plurality of distinct sets of programmable operating parameters, wherein each distinct set of programmable operating parameters comprises distinct programmable operating parameters for configuring a VFD portion of an industrial control device; and
    initiate display of the identified distinct set of programmable operating parameters to the user;
    wherein the plurality of distinct sets of programmable operating parameters comprises a distinct set of operating parameters for a fan and a distinct set of operating parameters for a pump.

2. The non-transitory computer readable medium of claim 1, wherein each distinct set of programmable operating parameters comprises a distinct subset of all available user-programmable operating parameters of the VFD.

3. The non-transitory computer readable medium of claim 1, wherein each distinct set of programmable operating parameters comprises a custom subset of operating parameters.

4. The non-transitory computer readable medium of claim 3, wherein the custom subset of operating parameters comprises a user-defined subset of operating parameters.

5. The non-transitory computer readable medium of claim 1, wherein each distinct set of programmable operating parameters comprises an industrial automation device based subset of operating parameters.

6. The non-transitory computer readable medium of claim 1, wherein each distinct set of programmable operating parameters comprises an industry specific subset of operating parameters.

7. The non-transitory computer readable medium of claim 1, wherein the plurality of distinct sets of operating parameters further comprises a distinct set of operating parameters for a compressor, a distinct set of operating parameters for a mixer, and a distinct set of operating parameters for a crane.

8. A method of presenting predefined subset of parameters for an industrial control device, the method comprising:
    presenting, on a user interface, at least two distinct application options, each distinct application option corresponding to a distinct type of application for which a variable frequency drive (VFD) may be purposed;

receiving a user selection for one of the two distinct application options;

identifying, in response to receiving the user selection, a subset of programmable operating parameters associated with the selected distinct application option from a plurality of subsets of programmable operating parameters, wherein each subset of programmable operating parameters comprises a unique subset of programmable operating parameters for configuring a VFD portion of an industrial control device; and displaying the identified subset of programmable operating parameters to a user;

wherein the plurality of subsets of programmable operating parameters comprises a subset of programmable operating parameters for a fan and a subset of programmable operating parameters for a pump.

9. The method of claim 8, wherein each distinct subset of programmable operating parameters comprises a custom distinct subset of programmable operating parameters.

10. The method of claim 8, wherein each distinct subset of programmable operating parameters comprises an industrial automation device based distinct subset of programmable operating parameters.

11. The method of claim 8, wherein the plurality of subsets of programmable operating parameters further comprises a subset of programmable operating parameters for a compressor and a subset of programmable operating parameters for a mixer.

12. An industrial control device comprising:

a user interface capable of presenting, to a user, a plurality of application options, each application option corresponding to a respective type of application for which a variable frequency drive (VFD) may be purposed;

a processor configured to identify, in response to receiving a user-selected application option via the user interface, a distinct set of programmable operating parameters corresponding to the user-selected application option from a plurality of distinct sets of programmable operating parameters, wherein each distinct set of programmable operating parameters comprises a distinct set of programmable operating parameters for configuring a VFD portion of an industrial control device, and initiate display of the identified distinct set of programmable operating parameters to a user at least in part via the user interface; and wherein the plurality of distinct sets of programmable operating parameters comprises a distinct set of operating parameters for a fan and a distinct set of operating parameters for a pump.

13. The industrial control device of claim 12, wherein each distinct set of programmable operating parameters comprises an application specific distinct set of programmable operating parameters.

14. The industrial control device of claim 12, wherein the plurality of distinct sets of parameters comprises a distinct subset of parameters for a compressor, a distinct subset of parameters for a mixer, and a distinct subset of parameters for a crane.

15. The industrial control device of claim 12, wherein each distinct set of programmable operating parameters comprises a custom distinct set of programmable operating parameters.

\* \* \* \* \*